United States Patent [19]

Wilhelmson

[11] Patent Number: 4,924,067
[45] Date of Patent: May 8, 1990

[54] TEMPERATURE CONTROLLED SOLDERING RESISTOR TO CHANGE THE SET TEMPERATURE

[75] Inventor: Jack L. Wilhelmson, Mt. Pleasant, S.C.

[73] Assignee: Cooper Industries, Inc., Houston, Tex.

[21] Appl. No.: 262,034

[22] Filed: Oct. 24, 1988

Related U.S. Application Data

[63] Continuation of Ser. No. 17,508, Feb. 24, 1987, abandoned.

[51] Int. Cl.[5] .......................... H05B 1/02; B23K 3/04; H01C 1/04; H01C 3/00
[52] U.S. Cl. .................................. 219/241; 219/227; 219/238; 338/76; 338/195; 338/227
[58] Field of Search ................ 219/240, 241, 236-239, 219/227, 229, 230, 496-499; 338/76, 77, 220, 221, 227, 195; 228/51-55

[56] References Cited

U.S. PATENT DOCUMENTS

| | | | |
|---|---|---|---|
| 3,004,234 | 10/1961 | Ponsy | 338/221 |
| 3,048,805 | 8/1962 | Bermi | 338/221 |
| 3,448,427 | 6/1969 | Baskett | 338/76 X |
| 3,504,132 | 3/1970 | Wallace | 338/227 X |
| 3,646,577 | 2/1972 | Ernst | 219/241 |
| 3,659,188 | 4/1972 | Alexander et al. | 338/221 X |
| 3,769,480 | 10/1973 | Lee | 338/76 X |
| 3,883,716 | 5/1975 | Fortune | 219/241 |
| 3,908,178 | 9/1975 | Johnson et al. | 338/221 X |
| 4,306,217 | 12/1981 | Solow | 338/195 |

FOREIGN PATENT DOCUMENTS 2921062 12/1980 Fed. Rep. of Germany ...... 219/241

Primary Examiner—Anthony Bartis
Attorney, Agent, or Firm—Michael F. Heim; Alan R. Thiele

[57] ABSTRACT

An accurate, setting-protected, temperature controlled soldering iron has a control circuit including a non-adjustable replaceable resistor mounted near the junction of the handle and the tube which holds the soldering tip. When it is desired to change the temperature of the soldering tip, the handle must be disassembled from the tube to replace the non-adjustable resistor. Very accurate control of temperature at the soldering tip is maintained by the utilization of different laser trimmed resistors having extremely accurate resistances. A window is provided in the soldering handle to observe a number associated with the value of the non-adjustable replaceable resistor.

13 Claims, 3 Drawing Sheets

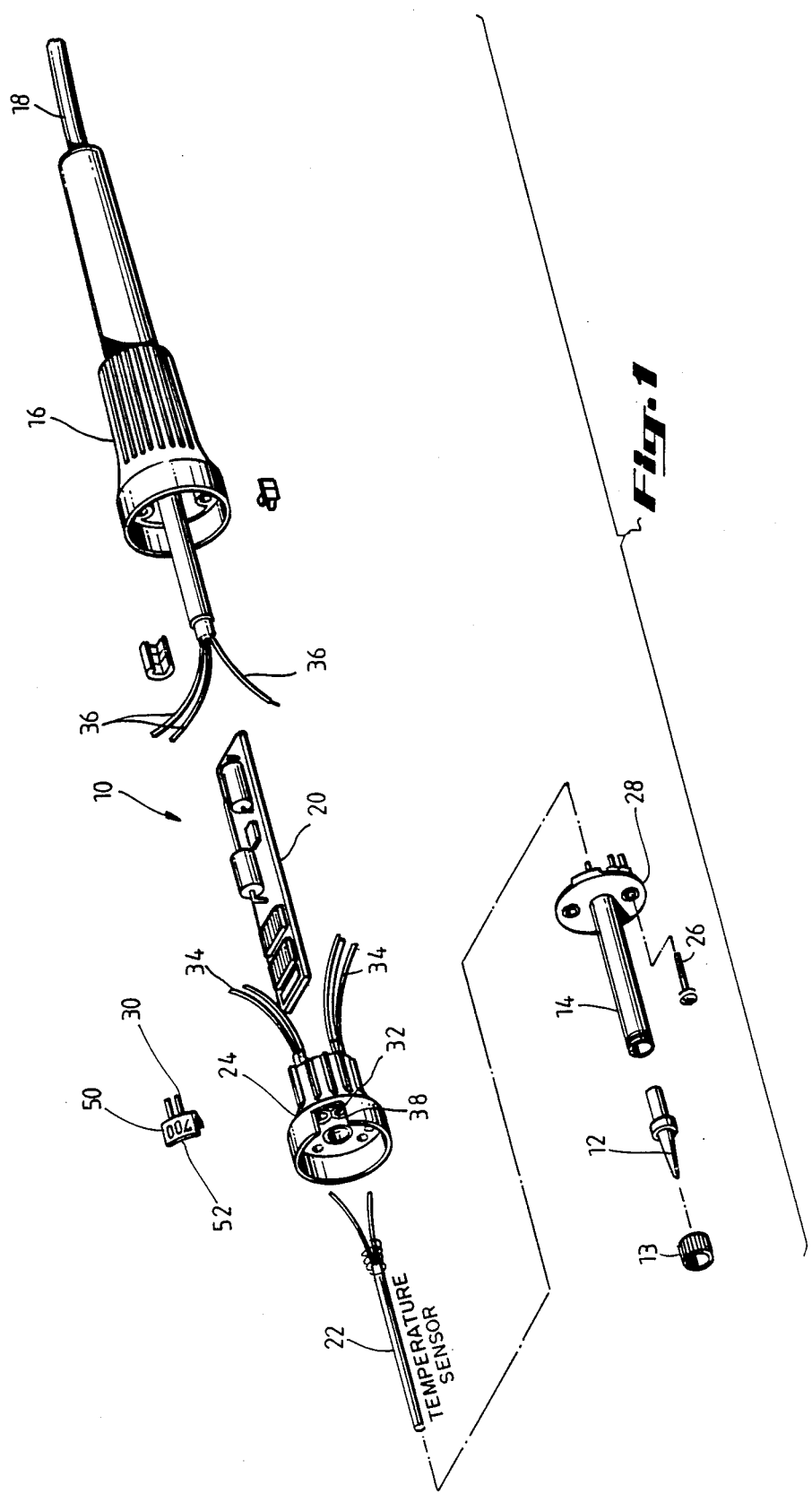

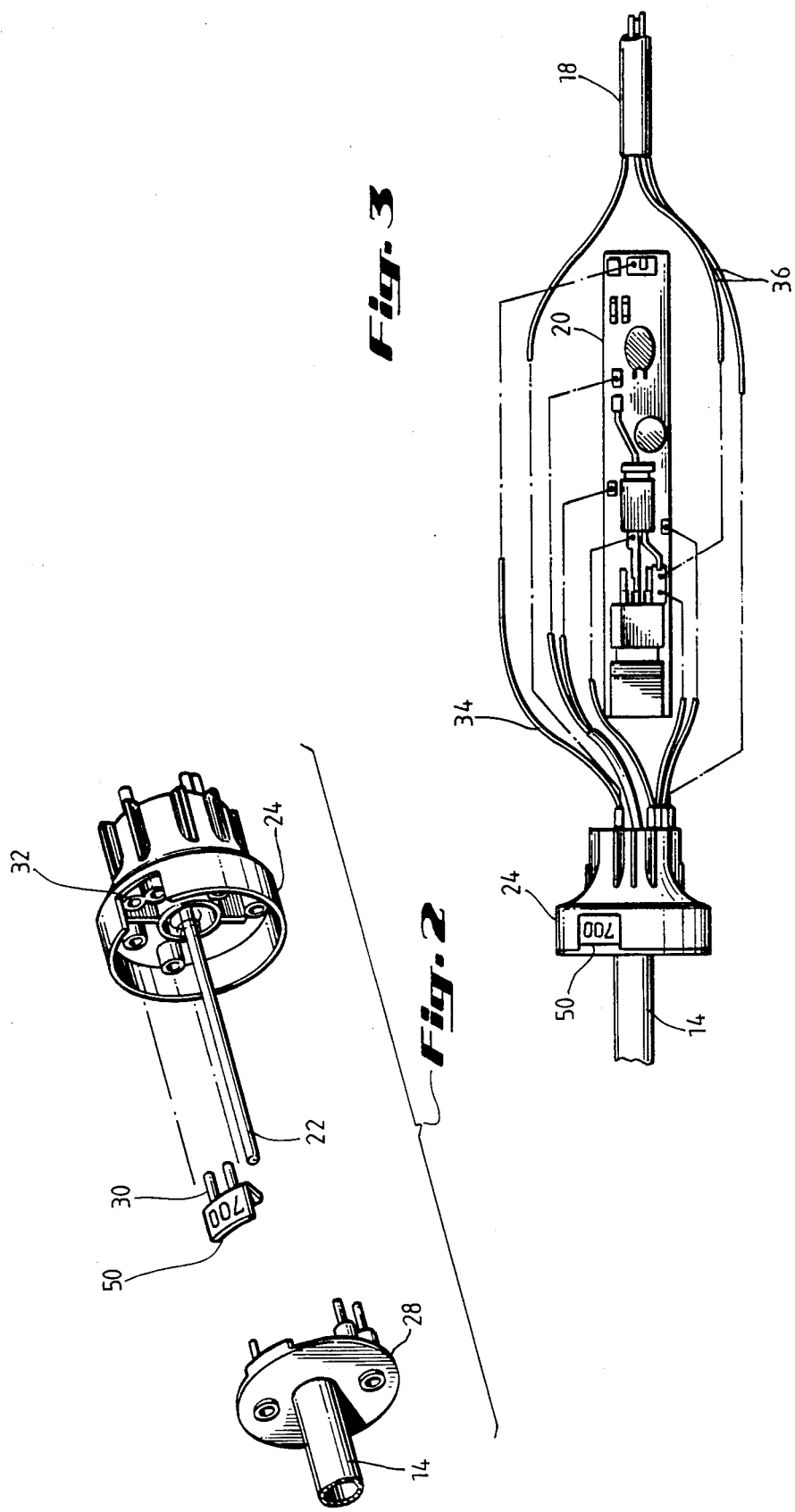

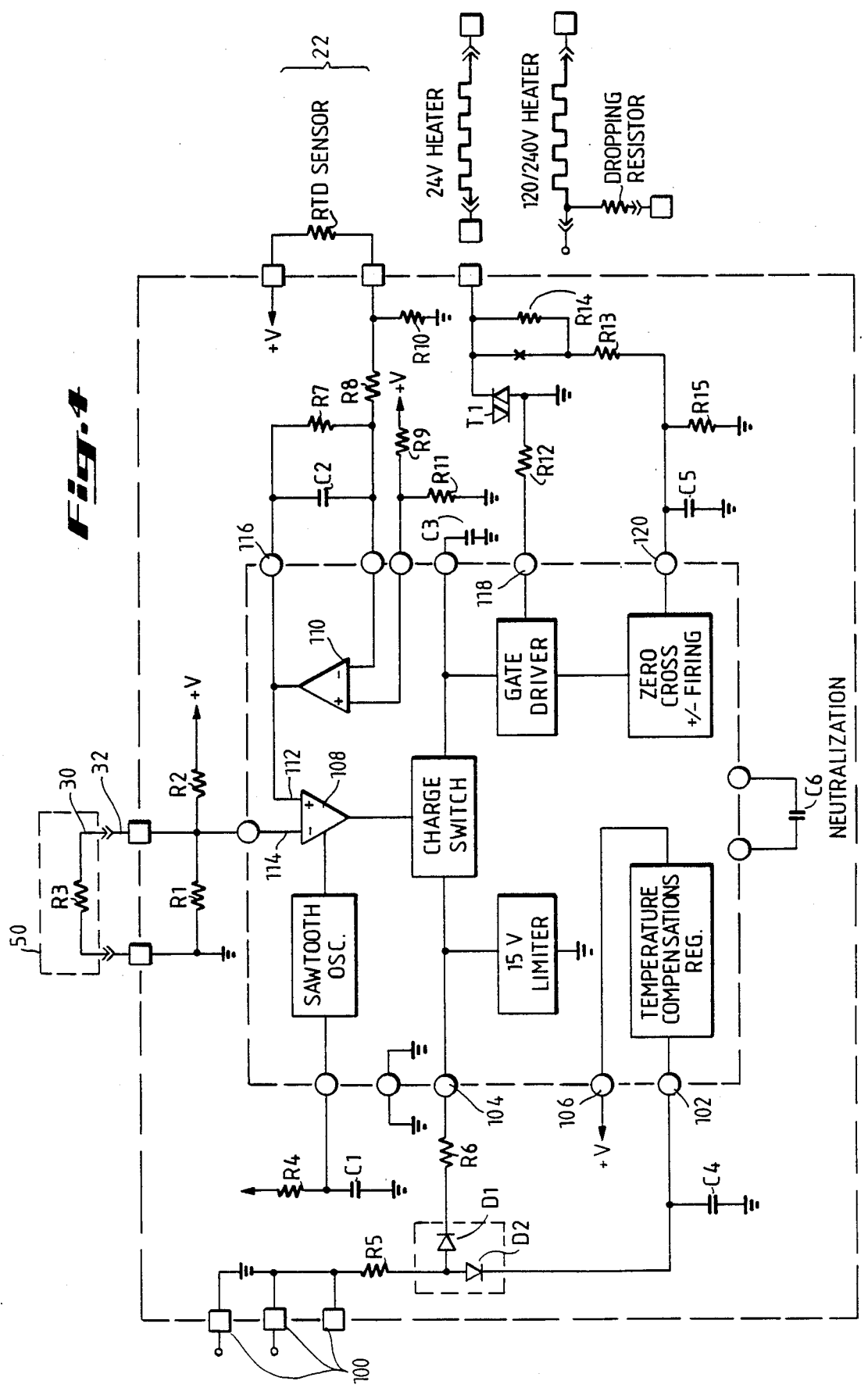

TEMPERATURE CONTROLLED SOLDERING RESISTOR TO CHANGE THE SET TEMPERATURE

This application is a continuation of U.S. Ser. No. 07/017,508, filed Feb. 24, 1987, now abandoned.

BACKGROUND OF THE INVENTION

This invention refers to electric soldering irons; more particularly, temperature controlled soldering irons.

Temperature controlled soldering irons are not new to the electric soldering iron art. Such temperature controlled soldering irons have been found to have limited utility because of inherent inaccuracies and wide variations in tip temperature. Such inaccuracies and tip temperature variations are not acceptable in conditions where a very narrow temperature range must be maintained at the soldering tip in order to properly effect a soldered connection.

It has also been found that workers using temperature controlled soldering irons often turn the temperature control to the highest temperature setting in the mistaken belief that higher temperatures will permit faster soldering. Rather than increasing production rates, such higher temperatures either destroy the parts being soldered or produce an unacceptable soldered connection.

There is therefore a need in the art to provide a temperature controlled soldering iron having both accurate temperature control over a range of preselected temperatures and protection against on-station adjustment of the soldering iron tip temperatures to temperatures other than those prescribed for an effective soldered connections.

There is also a need in the art to be able to visually identify the tip temperature setting of temperature controlled soldering irons to a very accurate level.

SUMMARY OF THE INVENTION

An accurate, setting-protected, temperature controlled soldering iron has a control circuit including a non-adjustable replaceable resistor for accurately controlling temperature at the soldering tip. The non-adjustable replaceable resistor is located near the intersection between the handle for holding the soldering iron and the tube which holds the soldering tip. The resistance of the non-adjustable replaceable resistor is accurately controlled so that the temperature maintained at the soldering tip is held to very tight tolerances. Replacement of the non-adjustable replaceable resistor can be accomplished only by removing the tube from the handle and replacing the resistor.

In order to observe the size of the non-adjustable replaceable resistor mounted in the soldering iron, a portion of the replaceable resistor mounting and connection system is visible through a window in the handle. The visible portion of the replaceable resistor is marked with the temperature to be maintained at the soldering tip.

BRIEF DESCRIPTION OF THE DRAWINGS

A better understanding of the temperature controlled soldering iron of the present invention may be had by reference to the drawings wherein:

FIG. 1 is an exploded perspective view of the temperature controlled soldering iron of the present invention;

FIG. 2 is an enlarged perspective view of the replaceable resistor section;

FIG. 3 is an enlarged schematic view of the electrical connections to the replaceable resistor; and FIG. 4 is a schematic of the electrical circuit utilized in the temperature controlled soldering iron of the present invention.

DESCRIPTION OF THE EMBODIMENTS

In FIGS. 1-3 the temperature controlled soldering iron 10 of the present invention is shown. Included is soldering tip 12, a tube 14 for holding soldering tip 12 and a handle 16. Collar 13 connects tip 12 to tube 14. Extending from handle 16 is an electrical power cord 18 which supplies electrical power to soldering iron 10. Contained within tube 14 for holding soldering tip 12 is a heating element (not shown) which gets hot when subjected to the flow of electric current.

Contained within handle 16 is a circuit board 20. Mounted on circuit board 20 are various electrical components which receive an indication from a temperature sensing device 22 (RTD sensor in FIG. 4) of the temperature at soldering tip 12. These components respond by controlling the electrical input to the heating element. The heating element is thereby maintained at a temperature such that the temperature of soldering tip 12 is maintained at a relatively constant level. Power is supplied to circuit board 20 through wires 36.

Key to the operation of the temperature control circuitry is a resistor network which controls the current applied to the heating element. In order to accurately control the electrical current supplied to the heating element and thereby accurately control the temperature of the soldering tip, it is imperative that the resistors used in the resistor network be held to very accurate tolerances. Such accurate tolerances can be maintained by the use of "laser trimmed" resistors. These "laser trimmed" resistors are made from an electrically resistive ink which is painted onto a surface. The size of the area of ink painted onto the surface is determinative of the amount of resistance that the ink offers to the passage of electrical current. To provide a very precise resistance, it is necessary to trim the size of the area of ink to very accurate dimensions. In order to accomplish this trimming, lasers have been employed.

If a soldering iron user desired to solder at one of several very precise temperatures, it would be necessary to purchase an array of soldering irons, each having electrical components with precise characteristics selected to yield accurate temperatures. Prior art adjustable temeperature soldering irons have not provided the desired accuracy for tip temperature control.

In the temperature controlled soldering iron 10 of the present invention, a key 50 containing a laser trimmed resistor is positioned in receptacle 24. Receptacle 24 is positioned with respect to circuit board 20 in handle 16 such that the key containing laser trimmed resistor may be replaced when tube 14 for mounting soldering tip 12 is removed from handle 16.

Replacement of key 50 is accomplished by merely unscrewing mounting screws 26 (only one is shown) from screw holes 28. Soldering tip 12 and tube 14 are then pulled away from receptacle 24. The prongs 30 eminating from the bottom of the key containing laser trimmed resistor are pulled from socket holes 32. Another key 50 containing a different laser trimmed resistor may then be placed in the space vacated by the former key 50.

It will be noted that the connections to the resistor shown in the present disclosure are two tubular prongs 30 which extend into two female sockets 32 which are in turn electrically connected by wires 34 to circuit board 20. While wire connections 34 are shown in the preferred embodiment, it will be understood by those skilled in the art that a variety of electrical connection means may be used without departing from the scope of this invention.

The key 50 containing laser trimmed resistor includes an upraised indicating portion 52. This upraised indicating portion 52 is sized and located so that it may be seen through window 38 in receptacle 24 when the key 50 containing laser trimmed resistor is in place. In this manner the user will be able to determine the value of the resistance in the temperature control circuit or alternatively the value of the temperature occurring at soldering tip 12.

A brief description of the circuit operation may be had by reference to FIG. 4 and the following description.

An input of 24VAC is applied at terminals 100. Input current is limited by R5, a 510 ohm, ½ watt resistor rectified by diode D2, and filtered by C4, a 10 microfarad capacitor to supply +15VDC to pin 102.

The 24VAC input is also rectified by diode D1 and current limited by R6 a 510 ohm, ¼ watt resistor to supply current to the charge switch at pin 104.

A temperature compensated regulator supplies a precision regulated positive voltage at pin 106 for use by the external circuitry.

C1, a 2.2 microfarad capacitor and R4, a 200K ohm resistor form an external RC network for a sawtooth oscillator which supplies the proportioning signal to a comparator 108.

The 15 V limiter provides coarse voltage limitation at pin 104 as pin 102 must always have the most positive voltage.

Excitation current for the RTD sensor in the tool 10 is taken from the reference supply and limited by R10, a 2.2K ohm resistor.

The voltage across the RTD sensor is amplified by operational amplifier 110 and associated circuitry; R7, a 565K ohm resistor; R8, a 10K ohm resistor; R9, a 10K ohm resistor, and R11, a 372K ohm resistor. C2, a 0.1 microfarad capacitor, limits the high frequency response of the operational amplifier 110 to limit noise and C6, a 220 picofarad capacitor, is the neutralization capacitor. The output from the operational amplifier 110 is applied to the non-inverting input 112 of comparator 108.

The voltage at the inverting input of the comparator 108 is derived from the voltage divider R1, a 40.21K ohm resistor, R2, a 5K ohm resistor, and the resistor R3 in key 50. If the voltage into comparator 108 exceeds the voltage at pin 116 plus the instantaneous value of the proportioning signal during the positive half cycle of the line, the charge switch will be turned on and the capacitor C3 at pin 118 will be charged.

On the following negative half cycle, the triac voltage attenuated by R13, a 20K ohm resistor, R14, an 80K ohm resistor and R15, an 11.11K ohm resistor, at 120 volts applied to pin 118 will turn on the negative firing switch and gate driver. This causes C3 to discharge into the triac gate, current limited by R12, a 25 ohm resistor, turning on the triac T1 and applying 24VAC to the heating element in the soldering iron.

24 or 120/240VAC +/− firing circuitry turns on the gate to the triac and to the heater synchronization circuit. This is a commonly used technique to avoid the effects of RF noise.

It will be noted that the soldering iron of the present invention may be used with the zero crossing, hence both heaters are shown in FIG. 4.

On the following positive half cycle, the positive firing switch and gate driver will be turned on and the remainder of the charge on C3 is dumped into the triac gate, maintaining triac conduction.

A soldering iron capable of having various accurately controlled soldering tip temperatures is obtainable by using the same basic central control unit and changing the key 50 containing the laser trimmed resistors used herewith.

The key 50 containing the laser trimmed resistor is plastic with metal prongs 30 molded therein.

There is thereby provided by the soldering iron 10 of the present invention a device wherein the temperature of soldering tip 12 may be accurately maintained yet readily changed when desired.

Those of ordinary skill in the art will understand that the invention disclosed herein is to be determined only by the claims and their reasonable equivalents as determined by one of ordinary skill in the art.

I claim:

1. A soldering iron comprising:
   a soldering tip;
   a tubular member mounting said soldering tip;
   a hollow handle portion mounting said tubular member, said hollow handle portion being removably attached to said tubular member;
   an electrical heating element contained in said tubular member for heating said soldering tip;
   means within said hollow handle portion and connected to said heating element for controlling the energization of said electrical heating element to maintain the temperature of said soldering tip at a predetermined level;
   wherein said means for controlling the energization of said electrical heating element comprising an electronic temperature control circuit including a non-adjustable resistor whose resistance determines said predetermined temperature level of said soldering tip;
   said resistor being mounted on a readily removable replaceable key positioned within said hollow handle portion and electrically connected in said temperature control circuit by detachable plug-in electrical connectors, said key being constructed and arranged with respect to tubular member and said hollow handle portion that said key may be changed only by disassembling said tubular member from said hollow handle portion.

2. The soldering iron as defined in claim 1 wherein said key includes an identifying portion identifying the predetermined temperature level determined by the resistance of said resistor, said identifying portion being externally visible through a window in said hollow handle portion once said key is positioned in said hollow handle portion.

3. The soldering iron as defined in claim 1 wherein said resistor is a laser trimmed resistor.

4. In a temperature controlled soldering iron having a soldering tip, a tube holding said soldering tip, a handle connected to said tube, and means including an electrical temperature control circuit contained within said handle electrically connected to a heating element in heat exchange relationship with the tip for maintaining temperature at a predetermined level on said soldering tip, wherein said temperature control circuit includes a readily detachable, removable, non-adjustable resistor whose resistance determines the level at which the temperature is controlled on said soldering iron tip;

said readily detachable, removable, non-adjustable resistor being connected in said electrical temperature control circuit and contained within said handle by a detachable plug-in electrical connector;

said readily removable, non-adjustable resistor being so arranged with respect to said handle that it may only be detached and changed by disconnecting said handle from said tube.

5. The soldering iron as defined in claim 4 wherein said replaceable resistor includes an indentifying portion indicating a predetermined temperature level determined the resistance of said replaceable resistor which is visible externally of said tube and handle through an opening in said handle when said tube is mounted to said handle.

6. The soldering iron as defined in claim 5 wherein said handle includes a window forming said opening through which the identifying portion of said resistor may be observed.

7. A temperature controlled soldering iron, at least a portion of which may be disassembled, comprising:

a soldering tube on which a soldering tip is mounted;

a hollow handle attached to the soldering tube;

control means for regulating the operating temperature of said soldering tip, said control means including a removable resistor of a definitive resistance for maintaining said soldering tip at a specific temperature;

said removable resistor located in said soldering iron and being readily detachable from said control means, wherein the removable resistor may only be removed by disassembly of a portion of said soldering iron to gain access to said removable resistor.

8. A temperature controlled soldering iron as set forth in claim 7, wherein said soldering iron further comprises:

a heating element received within said tube; and said control means includes electrical control circuitry, electrically connected to said heating element, received within said hollow handle.

9. A temperature controlled soldering iron as set forth in claim 8, wherein said electrical control circuitry is mounted on a circuit board within said handle.

10. A temperature controlled soldering iron as set forth in claim 9, wherein said resistor includes an electrical plug-in connector received on said circuit board.

11. A temperature controlled soldering iron as set forth in claim 7, wherein said hollow handle must be removed from said soldering tube to detach said removable resistor from said control means.

12. A temperature controlled soldering iron as set forth n claim 7, wherein said removable resistor includes an indicating portion for displaying a numerical value associated with the temperature level of said soldering tip.

13. A temperature controlled soldering iron as set forth in claim 7, wherein said removable resistor includes an indicating portion for displaying a numerical value associated with the resistance value of said removable resistor.

* * * * *

UNITED STATES PATENT AND TRADEMARK OFFICE
CERTIFICATE OF CORRECTION

PATENT NO. : 4,924,067
DATED : May 8, 1990
INVENTOR(S) : Jack L. Wilhelmson

It is certified that error appears in the above—identified patent and that said Letters Patent is hereby corrected as shown below:

Column 4, line 29; after member insert "for",

Column 6, line 26; before n insert "i"

Signed and Sealed this

Thirty-first Day of March, 1992

Attest:

HARRY F. MANBECK, JR.

*Attesting Officer*  *Commissioner of Patents and Trademarks*